United States Patent
Gruda et al.

(10) Patent No.: US 9,582,688 B1
(45) Date of Patent: Feb. 28, 2017

(54) ELECTRONIC CHIP-BASED TAGGING SYSTEM FOR IDENTIFYING CLOSELY PROXIMATE THIN AND FLAT ITEMS

(71) Applicant: PharmaSeq, Inc., Monmouth Junction, NJ (US)

(72) Inventors: Maryann Gruda, Yardley, PA (US); Ziye "Jay" Qian, Monroe Township, NJ (US)

(73) Assignee: Pharmaseq, Inc., Monmouth Junction, NJ (US)

(*) Notice: Subject to any disclaimer, the term of this patent is extended or adjusted under 35 U.S.C. 154(b) by 478 days.

(21) Appl. No.: 13/870,357

(22) Filed: Apr. 25, 2013

Related U.S. Application Data

(60) Provisional application No. 61/638,023, filed on Apr. 25, 2012.

(51) Int. Cl.
| | |
|---|---|
| *G03H 1/00* | (2006.01) |
| *G08B 13/14* | (2006.01) |
| *G06F 17/00* | (2006.01) |
| *G06F 7/12* | (2006.01) |
| *G06K 7/015* | (2006.01) |
| *G06K 19/07* | (2006.01) |
| *G06K 7/10* | (2006.01) |

(52) U.S. Cl.
CPC .......... *G06K 7/015* (2013.01); *G06K 7/10009* (2013.01); *G06K 19/0728* (2013.01)

(58) Field of Classification Search
CPC .................................. G03H 1/00; G08B 13/14
USPC ........ 340/572.1, 572.8, 10.1–10.5, 539, 573; 435/7.1; 455/100, 49.1
See application file for complete search history.

(56) References Cited

U.S. PATENT DOCUMENTS

| | | | | |
|---|---|---|---|---|
| 3,817,347 | A * | 6/1974 | Spencer | 182/115 |
| 5,771,002 | A * | 6/1998 | Creek et al. | 340/539.21 |
| 6,297,737 | B1 * | 10/2001 | Irvin | 340/571 |
| 6,990,866 | B2 * | 1/2006 | Kibblewhite | 73/761 |
| 7,118,767 | B2 * | 10/2006 | Kim | A61K 36/03 424/725 |
| 7,126,755 | B2 * | 10/2006 | Moon | B01L 3/502761 250/566 |
| 7,174,238 | B1 * | 2/2007 | Zweig | 700/245 |
| 7,382,258 | B2 * | 6/2008 | Oldham et al. | 340/572.1 |
| 7,441,462 | B2 * | 10/2008 | Kibblewhite | 73/761 |
| 7,880,617 | B2 * | 2/2011 | Morris | G06K 7/10366 340/572.1 |
| 8,724,038 | B2 * | 5/2014 | Ganapathi et al. | 349/12 |

(Continued)

OTHER PUBLICATIONS

U.S. Appl. No. 13/239,801, filed Sep. 22, 2011, 26 pages.
Response to Office Action filed on Sep. 10, 2015 for U.S. Appl. No. 13/239,801, 13 pages.

*Primary Examiner* — Nam V Nguyen
(74) *Attorney, Agent, or Firm* — Moser Taboada

(57) ABSTRACT

Provided among other things is a tagging system for identifying closely proximate stacked items (e.g., thin and flat closely spaced items) each of which is tagged with an electronic radiation emitting chip with a built-in antenna incorporated therein. The tagging system comprises: (1) the tagged, closely spaced items, wherein the electronic radiation emitting chips are affixed on, and within the width of, thin side edges of the items; and (2) an ID reader capable of reading the IDs (identifiers) stored electronically on the chips, wherein the electronic radiation emitting chips are sufficiently aligned on the items such that the chips can be serially read with the ID reader.

19 Claims, 4 Drawing Sheets

(56) References Cited

U.S. PATENT DOCUMENTS

| | | | | |
|---|---|---|---|---|
| 2003/0062988 A1* | 4/2003 | Mandecki | ............ | G06K 7/1097 340/10.1 |
| 2012/0041111 A1* | 2/2012 | Christensen et al. | ......... | 524/111 |
| 2013/0332018 A1* | 12/2013 | Kim | ............................... | 701/22 |

* cited by examiner

ELECTRONIC CHIP-BASED TAGGING SYSTEM FOR IDENTIFYING CLOSELY PROXIMATE THIN AND FLAT ITEMS

This application claims the benefit of the U.S. provisional patent application Ser. No. 61/638,023, filed Apr. 25, 2012, which is herein incorporated in its entirety by reference.

Provided is a reader for identifying slides and other closely proximate items. In embodiments, the reader works with or incorporates a light-emitting reader for activating light-powered microtransponders.

Embodiments of the present invention generally relate to readers for defining (reading) identifiers on light-activated microtransponders (p-Chip transponders, also known as MTPs) attached to closely-spaced items such as specimen slides, tissue cassettes, microtiter plates, petri dishes, CDs, DVDs, Blu-Ray disks, flash memory cards (such as SD, miniSD, or microSD cards), printed circuit boards, and the like.

As described in U.S. Pat. No. 7,098,394, very small, MTPs are available to provide identifiers, for example as identifiers used in conjunction in nucleic acid assays. These have proven to be stable under a number of challenging conditions.

Radio frequency identification devices have been in use for some time in many applications, including for object tagging. Systems are available for example from Avid Technology, Inc. (Tewksbury, Mass.), Lutronic International (Rodange, Luxembourg) and Bio Medic Data Systems, Inc. (Seaford, Del.). In animal use, these systems are encapsulated, e.g., in biocompatible glass. Given the encapsulation, and the need for antennae, the smallest of these devices is believed to be a cylinder having a diameter of just less than 0.84 mm and the length of about 3 or 4 mm. As the transponder trigger for such systems is radio waves, typically there is no substantial issue with the orientation of the transponder once injected.

The most common method for tagging small items is barcoding. One-dimensional and two-dimensional barcodes may be printed and applied, or may be etched or molded into a specimen container. Barcodes suffer from the need to be visible (e.g., not hidden by closely stored items). Thus, bar code-labeled items often require removal of the items from the storage conditions in order to obtain sample identification of the relatively large barcode labels. In addition, barcode labels can easily be damaged or removed by abrasion, chemical insults and repeated exposure to cycling at extreme temperatures.

The small sizes available for MTPs allows for the narrow edge of numerous flat and small items to be tagged. Such tagged items are often stored in configurations where flat surface areas of the items are in close proximity to each other. Currently, in certain circumstances, optimal storage stacking cannot be achieved because there is no practical way to identify the contents except via writing on a major surface of the items or on storage packaging for the items.

Another feature of MTPs that allows for effective tagging of closely-spaced small items is that the signal that induces a response from the MTPs, a light beam, is narrowly focused, such that the identifier for only one item at a time is queried. Also, the speed of response allows the identifiers to be serially and quickly interrogated.

Devices and software for efficiently identifying closely-spaced items ("ID-items") are disclosed. For reading of closely stacked items (e.g., vertically stacked slides in a drawer), a rack reader is described. The rack reader can be used in a manual mode, or incorporated into an automated system. The rack reader allows the readout of for example 100 stacked slides in a few seconds. The same unit is capable of rapidly reading stacked items with fewer or more stacked items (10s, 100s, or thousands) with equal ease. Several exchangeable adapters ("form factors") for different types of items are developed to satisfy requirements of different sample geometries. In its basic implementation, the reader is connected to a computer via an interface such as USB 2.0 or Bluetooth, or the like.

SUMMARY

Embodiments of the present invention generally relate to the identification of small closely proximate stacked items peripherally tagged with light-responsive transponders.

Provided, among other things, is a slide with a fixed light-responsive transponder and a reader for reading the p-Chips affixed to the items.

Provided among other things is a tagging system for identifying closely proximate stacked items (e.g., thin and flat closely spaced items) each of which is tagged with an electromagnetic radiation (e.g., radio frequency) emitting chip with a built-in antenna incorporated therein, comprising: the tagged, closely spaced items, wherein the electromagnetic radiation emitting chips are affixed on, and within the width of, thin, side edges of the items; and an ID reader capable of reading the IDs (identifiers) stored electronically on the chips, wherein the electromagnetic radiation emitting chips are sufficiently aligned on the items such that the chips can be serially read with the ID reader. The system can include a controller operatively linked to the reader Also provided is a reader for closely proximate stacked items peripherally tagged with light-responsive transponders, the reader comprising: a body incorporating or adapted to reversibly couple with a wand for reading the transponders, the wand emitting a modulated light signal from a port; one or more movement elements coupled to, adapted to couple to, or incorporated into the body; and one or more aligners coupled to or incorporated into the body, configured or adapted to operate with a corresponding element on a stack of the items, or a container for a stack of the items, so as to align the light-emitting port with the transponders. The movement element(s) can be for example skids, rollers or wheels. The movement element can be a robot programmable to move the body, with aligner engaged with the corresponding element, along the stack of items so that the light-emitting port serially aligns with the transponders of the stack. The aligner(s) can be for example slots or fins, which shaped to funnel the sides of the items into better alignment with the light-emitting port. The reader can comprise a mask adapted to limit leakage of the emitted light in a forward or backward direction relative a direction for which the reader is adapted to move. The reader can comprise a controller operatively linked to the wand.

Further provided is a method of operating a reader, comprising: inputting into a controller an identifier for a sought-for item; moving the reader along a stack of items such that the light-emitting port and the transponders serially align; and emitting a positive signal when the reader reads an identifier corresponding to the inputted identifier. In certain embodiments, the method includes emitting a distinct negative signal (such as a sound) in conjunction with the wand reading a non-matching or a series of non-matching transponders. The method can include: moving the reader past a sought-for item such that the signal is emitted; and moving the reader in the opposite direction to again align with the sought-for item such that the signal is emitted.

The method can include the activation of a mechanical gripper either manually or automatically upon recognition of the inputted identifier, wherein such automatic activation can comprise the positive signal, and wherein automatic activation is under the direction of the controller.

Further provided is a method of scanning closely proximate stacked items, comprising: inputting into a controller an identifier for a sought-for item; moving an ID reader capable of reading the IDs (identifiers) stored electronically on the chips along a stack of items tagged with such chips such that the reader and the transponders serially align for reading IDs; and emitting a positive signal when the reader reads an ID corresponding to the inputted identifier. In certain embodiments, the method includes emitting a distinct negative signal (such as a sound) in conjunction with the wand is reading a non-matching or a series of non-matching transponders. The method can include: moving the reader past a sought-for item such that the signal is emitted; and moving the reader in the opposite direction to again align with the sought-for item such that the signal is emitted. The method can include the activation of a mechanical gripper either manually or automatically upon recognition of the inputted identifier, wherein such automatic activation can comprise the positive signal, and wherein automatic activation is under the direction of the controller.

Additional positive signals can be utilized, such as a light highlighting the found item, or an electronic signal to the controller.

Where this specification describes methods of reading the affixed p-Chips or identifying and/or retrieving closely proximate stacked items based on their p-Chip ID, the devices pooling the functions implied by the method steps are within the invention. Conversely, where devices are defined with certain functions whose use is clear from the specification, the methods implied by these uses are within the invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of the invention's scope, for the invention may admit to other equally effective embodiments.

The reading face of an exemplary MTP (defined below) is shown schematically in FIG. 1. The MTP has photocells 1, antenna 2, logic circuits 3, and memory circuits 4.

Figure 2:
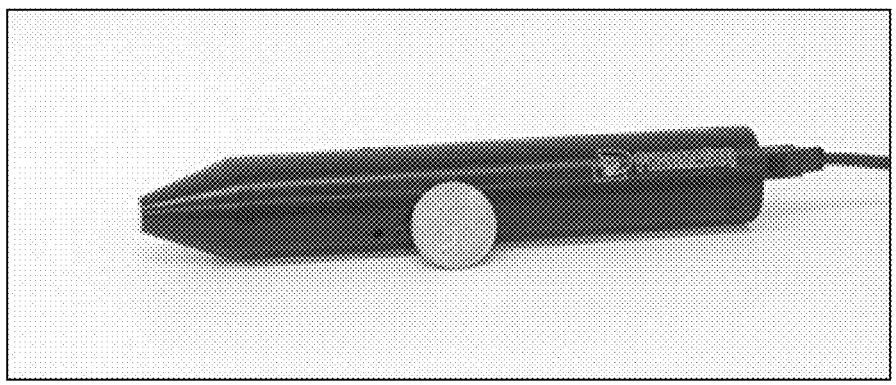

A exemplary wand device for reading an MTP is illustrated in FIG. 2, with a U.S. quarter superimposed for scale.

Figure 3:
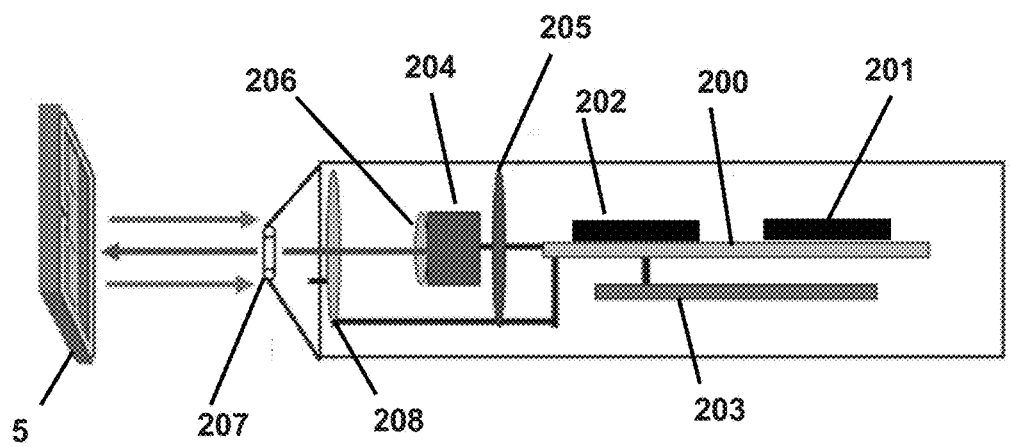

The electronic features of a wand device for reading an MTP are shown in FIG. 3.

Figure 4:
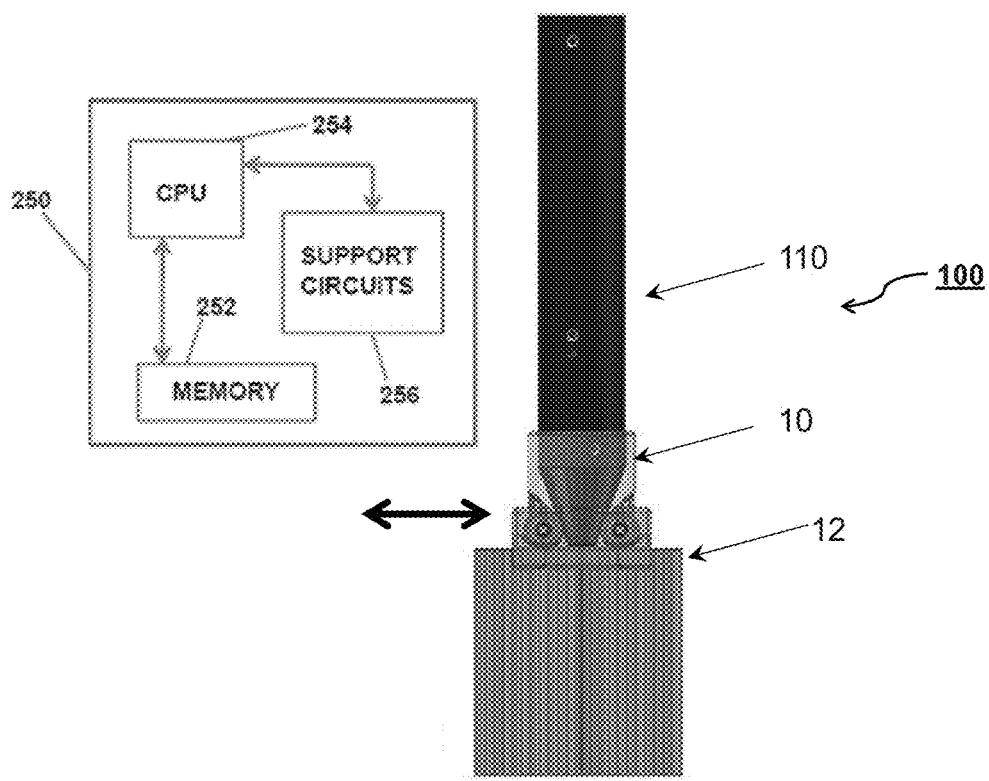

FIG. 4 schematically depicts one embodiment of a rack reader with wand device illustrating the reading of MTPs affixed on glass slides stored in a vertical stack (thin long side of slides shown).

FIGS. 5A-5C schematically depict one embodiment of a rack reader adapter (FIG. 5A) for vertically stacked glass slides illustrating the adapter body, alignment fins, ball bearings and roller shaft. FIG. 5B is a detail view of a roller. FIG. 5C is a top view of adapter body showing mask with slot for laser.

Figure 6:
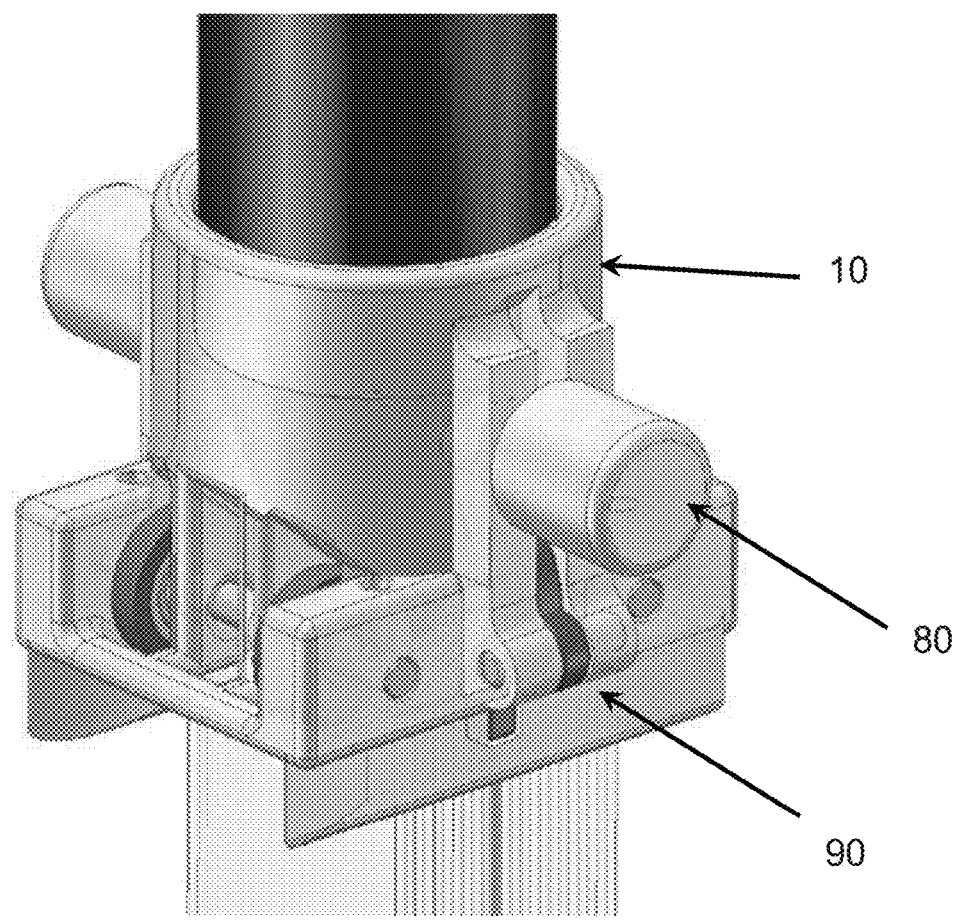

FIG. 6 illustrates one embodiment of a rack reader for mechanical retrieval of slides from a stack of slides illustrating the rack reader adapter, wand device, solenoids, mechanical gripper mechanism and vertically stacked slides.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

Figure 1:
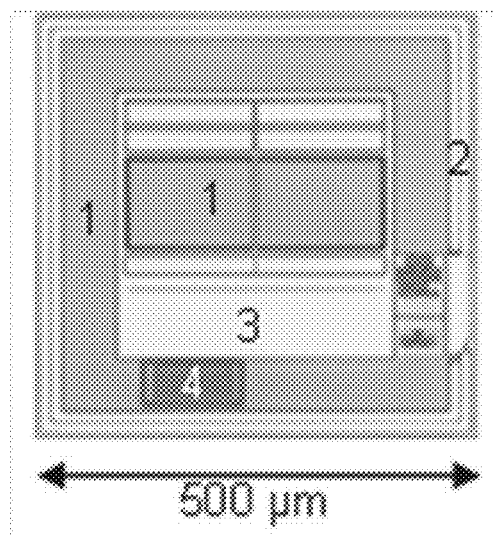

The invention is a new type of electronic chip-based tagging and retrieval system for rapid identification of small, closely spaced items such as microscope slides and tissue cassettes used and stored in histopathology laboratories. In one embodiment, the electronic tagging devices are based on a laser light-powered microtransponder (FIG. 1) whose major advantages are small size, monolithic (one part) design, inertness (silica-based), robustness and very low cost (i.e., MTPs). The devices consist of cassettes or slides tagged with the chip and an ID reader that can read the chips in batch without removal from the storage system. The system can be used in histopathology laboratories. However, the system has the potential to greatly widen the use of electronic tags in a variety of research and clinical laboratories, or even lead to the general adoption of this technology as a universal tagging system that can track a tissue carrier from one-time use in the laboratory to prolonged storage under essentially all reasonably likely conditions.

The Clinical Laboratory Improvement Amendments of 1988 (CLIA) stipulates that in order to be accredited, laboratories must retain paraffin tissue blocks for a minimum of two years and histopathology slides for at least 10 years from the date of examination [1]. Some states impose further regulations requiring pathology specimens to be retained for 20 years [2]. Such requirements mandate a highly reliable and preferably electronic system with the large number of samples that must be retained. Barcodes have been introduced as an electronic method for tagging slides and cassettes. One-dimensional and two-dimensional barcodes may be printed either directly on, or on a label that is applied to, the slide or cassette. The adhesives used in labels can fail in the solvents used for processing tissues, particularly xylene, causing some companies such as Brady (Milwaukee, Wis.) to implement a dual adhesive/mechanical embedding system to ensure label attachment for cassettes. Direct printing systems are available from Thermo Scientific (Waltham, Mass.) and General Data Company (Cincinnati, Ohio). Considerable advancements have been made in the printing methods to minimize solvent damage. Preparing the labeled slides and cassettes appears straightforward, yet is often fraught with problems from markers clogging, drying out or inks smearing before dry. Such printing systems typically cost $15,000 to well over $50,000, putting them out of reach of many facilities.

RFID technology has made significant inroads into healthcare to improve the identification and traceability of a variety of medical items. Several manufacturers, such as TAGSYS RFID (Cambridge, Mass.) and Magellan Technology (Stafford, UK) offer large adhesive RFID label systems [4, 5] with desktop readers and a special adhesive labels containing an embedded RFID device are attached to the exterior of sample containers. While these methods have found applications in tagging cryovials, blood bags, and other such items, advancement in histopathology applications has been slow due to the larger size of the tags, their high cost, and their inability to withstand harsh processing chemicals [6]. In contrast, slides and cassettes can be readily tagged with MTPs due to the chemical stability and extremely small size of MTPs, since the dimensions of both the chip and the thickness of a typical glass microscope slide (1.2 mm) or a cassette wall (average of 0.91 mm) are compatible.

Mu-chips (Hitachi) were placed on the horizontal surface of slides and tested as a method to identify slides without picking each slide up [7]. However these chips were unsatisfactory for several reasons, mainly because they require the attachment of a long antennae to the surface of the slide or cassette. This has restricted the amount of space to apply tissue samples, interfered with coverslipping, interfered with pathologist's workflow by creating a "bump" on the slide surface, and reduced the ability to closely stack the slides due to increased slide depth. Moreover, these chips create problems in resolving the many IDs that are simultaneously stimulated when closely stored items are queried with a standard RF in/RF out RFID system.

The small, closely spaced items are often stored in stacks (vertical, horizontal, or otherwise), generally in a holder (which can be termed a "tray") that imposes order on the stack.

In certain embodiments the closely proximate items are arrayed such that the mean distance between reference points is 10 mm or less, 9 mm or less, 8 mm or less, 7 mm or less, 6 mm or less, 5 mm or less, 4 mm or less, 3 mm or less, 2 mm or less, 1.5 mm or less, 1.4 mm or less, 1.3 mm or less, 1.2 mm or less, 1.1 mm or less or 1 mm or less. The reference point is any point that can be determined on a given type of item to facilitate measuring the separations of the items. For example, with slides arrayed as in FIG. 4, the reference points can be the left sides of the slides.

Illustrative Reader for Pathology/Histology Slides

The system for pathology slides includes a line of slides (e.g., glass) with permanently mounted MTPs, thus assuring absolute connectivity of the tag with the container. The ID can be registered at the time the specimen is placed in the slide or cassette linking it to the electronic sample record. The MTPs can be mounted on the side of slides so that slides can be identified while stored within storage drawers. Additional identification means are possible, but not necessary. For instance, the MTP can coexist with a barcode, or a hand written label, which some users may prefer. Dual MTP tags and hand or printed labels can also be used.

The system can include an ID reader, such as a handheld ID reader about the size of a stapler. A form factor can be used to direct the alignment of the slides for reading. Most slides utilize a common form so that one reader configuration should be able to read all or most slides with appropriately positioned MTPs. The reader is connected to a computer by wire, such as via a USB2 interface, or through a wireless connection, e.g., Bluetooth, Wi-Fi, or protocols used in wireless cell phone communication, or the like.

Figure 5:
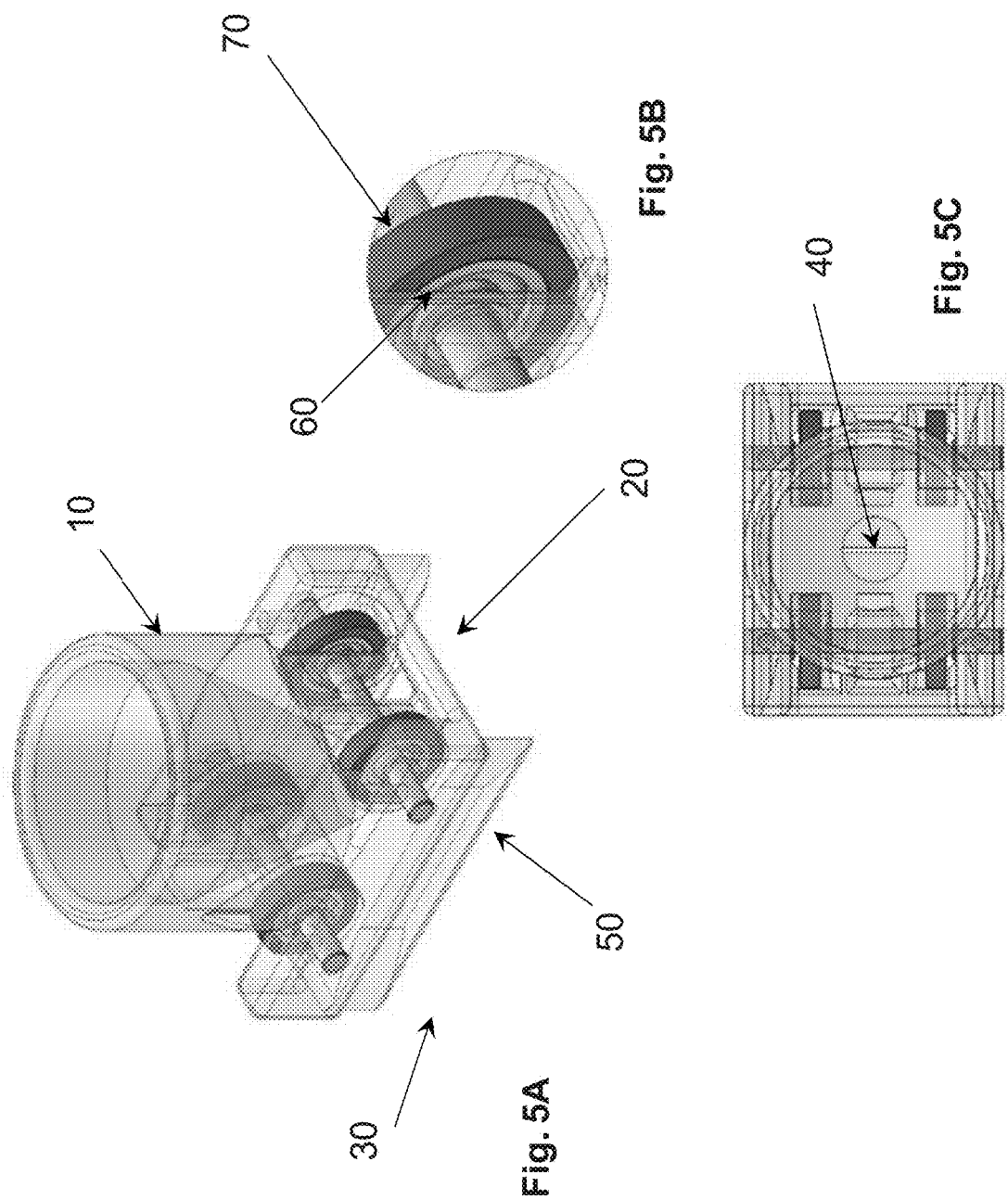

FIG. 5 illustrates a mechanical attachment that, together with the ID reader, forms the movable reader 100 (shown schematically in FIG. 4). The movable reader can comprise a slot or form factor 10 for slidably aligning a MTP wand (110, FIG. 4), movement elements 20 (here illustrated as wheels), and aligners 30 (e.g., slots or fins). The form factor 10 is shown as if transparent to indicate the relationship of the parts. Movement elements can be for example skids, rollers, wheels, or the like, or can be a robotic device that moves that movable reader along programmable pathway.

The slidable reader can further have a mask 40 situated between the MTP wand and the ID-items, adapted to limit the amount of triggering light from the MTP wand that might stray to a neighboring item relative to the ID-item sought to be queried. The ID reader can be integral to the slidable reader 100. The ID reader 110 can also be used without an attachment (as shown in FIG. 2), that is, independent of the slidable reader.

Aligners 30 can be, for example, any number of structures configured or adapted to operate with a corresponding element on a stack of ID-items, or a container for a stack of ID-items. For example, with pathology slides the corresponding structure can be edges of a stack of slides as presented at the top of an open slide cabinet. In this case, and in other such circumstances, the aligners can be shaped to funnel the slides so that the point with the MTP is aligned with the MTP wand when the slide passes the read point.

In this context, "stack" means a grouping of ID-items (vertical, horizontal, or otherwise) that are sufficiently aligned to allow the aligners to function to provide the final alignment for reading.

In the illustrative embodiment of FIG. 5, the movable ID reader has wheel shoes 70, framed on ball bearing casements 60, which provide a movable connection to shaft 50. The movable ID reader can forego wheels and comprise a sled. In the illustrated embodiment, all of the wheels can be allowed to move independently. Other designs will be apparent to those of skill such as those that rotatably engage the shaft to the housing. Where embodiments utilize powered movement, a drive motor can engage the shaft. Or, movement can be effected with robotic arms or the like.

As illustrated in FIG. 6 a movable ID reader 100 for aligning, reading and capturing closely proximate stacked items based on the queried p-Chip ID. Illustrated is one embodiment of the movable reader 100, illustrated with a solenoid 80 for activating a mechanical clamp 90 to grab the queried item. One slide is illustrated in a darker shade to show the slide aligned for clamping by the mechanical clamp 90. Those of skill in the art will recognize that the grabbing can be done by other methods, such as utilizing one or more relatively narrow suction channels adapted to align with the edge of the item. Or, for example, the items may be sufficiently spaced apart (e.g., due to the form factor provided by a tray) that a mechanism can grip the sides of the slides.

In certain embodiments, the ID reader can read electronic radiation emitting chips in addition to MTPs. In certain embodiments, further adjustments can be made to minimize overlapping readouts. For example, a detailed analysis of the analog signal received by the wand can be performed, possibly combined with the use of two or more receiving antennas to spatially separate the receiving signals.

Query Algorithms

The movable reader generally operates with a controller 250 (FIG. 4), which comprises a central processing unit (CPU) 254, a memory 252, and support circuits 256 for the CPU 254 and is coupled to and controls the movable reader or, alternatively, operates to do so in conjunction with computers (or controllers) connected to the movable reader. For example, another electronic device can supply software, or operations may be calculated off-site with controller 250 coordinating off-sight operations with the local environment. The controller 250 may be one of any form of general-purpose computer processor that can be used for controlling various devices and sub-processors. The memory, or computer-readable medium, 252 of the CPU 54 can be one or more of readily available memory such as random access memory (RAM), read only memory (ROM), flash memory, floppy disk, hard disk, or any other form of digital storage, local or remote. The support circuits 256 are coupled to the CPU 254 for supporting the processor in a conventional manner. These circuits can include cache, power supplies, clock circuits, input/output circuitry and subsystems, and the like. Methods of operating the movable reader can be stored in the memory 252 as software routine that can be executed or invoked to control the operation of the device 100. The software routine can also be stored and/or executed by a second CPU (not shown) that is remotely located from the hardware being controlled by the CPU 254. While the above discussion may speak of the "controller" taking certain actions, it will be recognized that it may take such action in conjunction with connected devices.

In an illustrative method of operation, for example:
- An identifier for a sought-for ID-item is inputted into the controller;
- If needed, the controller utilizes a database to convert the inputted identifier to a corresponding identifier found on the MTP of the sought-for ID-item;
- The movable reader is moved (e.g., robotically under the control of the controller, or slid manually, for examples) across a stack of ID-items;
- The controller causes the wand to query with light the MTPs with sufficient frequency that, with a movement encompassing between 1 and 60,000 MTPs a minute, the MTPs for all of the ID-items in the stack will be queried.
- As each query is responded to by the associated MTP, the controller compares the identifier to the identifier of the sought-for ID-item;
- As needed, the controller can ignore repetitions of the same identifier—which may be generated where the frequency of queries in conjunction with the speed of movement is such that a given MTP is queried more than once.
- For manual movement of the movable reader, the controller can cause a distinct signal (e.g., sound, visual on an image display device) to be generated when the sought-for ID item is encountered. Preferably a separate distinct signal is generated as each or each of a number of ID-items are read, so as to provide validation that the system is operating.
- In certain embodiments, the movable reader can be moved back and forth at different speeds to allow the user to narrow the association between the distinct signal and the sought-for ID-item.
- For robotic movement, generally the location of the sought-for ID-item is fully identified on the first pass.

The movable reader system can embody other elements that allow the queries from the wand to exactly match alignment with each MTP. For example, a camera may provide information that the controller utilizes to align queries with the location of the movable reader relative to the ID-items.

"Alignment" of the ID reader and a chip means sufficient alignment that a triggering event from the ID reader substantially (e.g., 99%+) only triggers the chip and not one on an adjacent item.

The movable reader system can embody robotic control and programming to use the wand to scan a stack of items at desired times and record any changes in item placements, additions or removals for monitoring item inventory.

The movable reader system can embody other elements that allow the capture of queried items by means of a mechanical gripper either manually or automatically upon recognition of the queried identifier. This embodiment of the movable reader system can embody robotic control and programming to use the wand to scan a stack of items for a targeted item, and to stop and grip the item when found. The search algorithm can start with the last recorded location in a tray, or with the tray that was last recorded to contain the item.

ID-Items

Illustrative ID-items include, for example, specimen slides, tissue blocks, blood spot cards, microtiter plates, petri dishes, CDs, DVDs, Blu-Ray disks, flash memory cards (such as SD, miniSD, or microSD cards), printed circuit boards, microfluidics chips, wafers, and the like.

For ID-items that are round or oval or a more complicated shape in their major dimensions (the non-thin dimensions), robots or alignment features (tabs, holes, and the like) can be used to maintain the positioning of the MTPs so that they can be serially read.

MTPs

A MTP has a length, width and height. A planar MTP is one where the height is 50% or less than the smallest of the length or width. In some embodiments, the height is 40% or less, 35% or less, 30% or less, 25% or less, or 20% or less, than the smallest of the length or width. MTPs used in the invention are often, but not necessarily, square or rectangular, consistent with a focus on low cost of production. A MTP is one where the longest of the length or width is 1.2 mm or less. In some embodiment, the longest of the length or width is 1.1 mm or less, 1.0 mm or less, 0.9 mm or less, 0.8 mm or less, 0.7 mm or less, or 0.6 mm or less. or 0.5 mm or less, or 0.4 mm or less, or 0.3 mm or less, or 0.25 mm or less, or 0.2 mm or less, or 0.15 mm or less. In one embodiment, the microchip is 600 micron×600 micron×100 or 120 micron [8, 9].

Methods to Mount MTPs on Glass Slides

Methods to mount MTPs can be found for example in U.S. Ser. No. 13/239,801, filed Nov. 22, 2011, which is incorporated herein in its entirety.

Illustrative ID Reader

The illustrative ID reader (wand) of FIG. 2 is a hand-held device that can connect to a standard PC and capable of reading the serial number (ID) of individual MTPs [10-12]. The wand or ID reader can be, as in FIG. 3 for example, USB-powered and contain a digital printed circuit board 200 having USB 2.0 transceiver microcontroller 201, a field programmable gate array (FPGA) 202, power converters and regulators 203, a laser diode 204 with programmable current driver 205, an optical collimation/focusing module 206, and a tuned air coil pickup 207 with a high gain, low noise differential electromagnetic radiation receiver (e.g., RF) with hysteretic comparator data slicer 208. The FPGA code in the ID reader can be upgraded to support incorporation of new features and performance enhancements. The wand can contain a laser, for example emitting an average of 60 mW of optical power at 658 nm. The ID is read when the MTP 5 is placed within suitable proximity of the laser light. The light can be, for example, pulsed at 1 MHz; this feature can provide the data clock used by the MTP for synchronization of the transmitted ID data bits. The timing of the pulse groups can be set so that the duty cycles and average power levels fall within requirements for registration as a Class 3R laser device.

The resulting ID readout from the MTP can be rapid (less than 0.01 sec) and can be reported on the PC using application-specific software. A performance parameter of the wand is its read volume; i.e., the space beyond its tip in which the ID can be read. This volume is a function of several variables, including illumination angle, illuminance energy, attenuation factors and tuning of the optical system's focal point. For example, it can be approximately 12 mm³ (8 mm×1.5 mm×1 mm).

Conventional, passive RFID tags harvest power from the driving RF signal using antenna coils that are typically many centimeters in diameter. This setup results in up to approximately 1% efficiency of power transfer to the RFID device. In the case of those RFID methods that do not use such a large external antenna (such as the Hitachi mu-chip, now withdrawn from the market), the antenna efficiency drops by orders of magnitude, severely curtailing range and efficacy. Light energy harvested by photodiodes in the MTPs results in up to 10% efficiency in power transfer. Thus, because light-powered MTPs use energy more efficiently, they can achieve greater transmission ranges for the given small antenna size relative to pure RFID-based approaches. No other solution is smaller and more energy efficient.

Further, the method of powering each MTP by a tightly focused laser beam allows specificity of physical addressing, i.e., addressing a dense array of tags in close proximity one tag at a time—an approach that is not feasible with conventional RFID methods. Using traditional RFID methods, multiple tags in close proximity will attempt to communicate simultaneously, mutually interfering with one another and preventing reading of the tags. This phenomenon is known as "RFID tag collision." An RF signal is only emitted from MTPs that are activated by the laser allowing precise positional specificity that can be applied to closely spaced, very small items.

MTP features enable a high level of security. While some RFID technologies enable additional information content, MTPs are conveniently made to contain only an ID number. All other information related to the sample container can be stored in a secure database. Thus, nothing about the sample can be determined from the physical sample container itself. In addition, the benefits of the small form factor of the MTP antenna limits transmission range to, for example, 1 cm or less, so that unintended transmissions are not likely.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

REFERENCES 1. 42 Code of Federal Regulations 493.1105—Standard: Retention Requirements. 2009. http://www.gpo.gov/fdsys/pkg/CFR-2010-title42-vol5/pdf/CFR-2010-title42-vol5-sec493-1105.pdf
2. Eiseman E, Haga S B 1999 Handbook of Human Tissue Sources, A National Resource of Human Tissue Samples, RAND
3. Eiseman E, Bloom G, Brower J, Clancy N, Olmsted S, Case Studies of Existing Human Tissue Repositories "Best Practices" for a Biospecimen Resource for the Genomic and Proteomic Era http://prostatenbn-pilot.nci.nih.gov/docs/03RAND.pdf
4. http://www.tagsysrfid.com
5. http://www.magellan-technology.com
6. Lou J J, Andrechak G, Riben M, Yong W H. 2011. A review of radio frequency identification technology for the anatomic pathology or biorepository laboratory: Much promise, some progress, and more work needed. J Pathol Inform 2:34.
7. Leung A A, Lou 1.1, Mareninov S, Silver S S, Routbort M J, Riben M, Andrechak G, Yong W H. 2010. Tolerance testing of passive radio frequency identification tags for solvent, temperature, and pressure conditions encountered in an anatomic pathology or biorepository setting. J Pathol Inform 1:21.
8. Mandecki W, Ardelt B, Coradetti T, Davidowitz H, Flint J, Huang Z, Kopacka W, Lin X, Wang Z, and Darzynkiewicz Z. 2006. Microtransponders, the miniature RFID electronic chips, as platforms for cell growth in cytotoxicity assays. Cytometry Part A 69A:1097-1105.
9. Lin X, Flint J, Azaro M, Coradetti T, Kopacka W, Streck D, Wang Z, Dermody J, and Mandecki W. 2007. Microtransponder-based multiplex assay for genotyping cystic fibrosis. Clin Chem 53:1372-1376.
10. Robinson E J H, Thomas O, Richardson T O, Sendova-Franks A B, Feinerman O, and Franks N R. 2009. Radio tagging reveals the roles of corpulence, experience and social information in ant decision making. Behav Ecol Sociobiol, 63(5) 627-636.
11. http://pharmaseq.com/pages/rfid.html
12. Gruda M C, Pinto A, Craelius A, Davidowitz H, Kopacka W, Li J, Qian J, Rodriguez E, Kuspiel E and Mandecki W. (2010) A system for tagging laboratory mice with light-activated microtransponders. J Am Assoc Lab Animal Science 49 (6):826-831.

Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

While the foregoing is directed to embodiments of the present invention, other and further embodiments of the invention may be devised without departing from the basic scope thereof, and the scope thereof is determined by the claims that follow. Any claim below that is written as dependent on an independent claim can also be written as dependent on any of the claims under such independent claim, except where logic forecloses such a dependency.

What is claimed is:

1. An identification (ID) reader for closely proximate stacked items that are peripherally tagged within a width of, thin, side edges of the items with light-responsive transponders, the reader comprising:
   a body incorporating or adapted to reversibly couple with the ID reader for reading the transponders, the ID reader emitting a modulated light signal from a light-emitting port;
   one or more movement elements coupled to, configured to couple to, or incorporated into the body; and
   one or more aligners coupled to or incorporated into the body, adapted to operate with a corresponding element on a stack of the items, or a container for a stack of the items, so as to align the light-emitting port with the transponders to trigger the transponders, wherein the ID reader is configured for reading closely proximate stacked items that are specimen slides, tissue cassettes, tissue blocks, blood spot cards, microtiter plates, petri dishes, Compact Disks (CDs), Digital Versatile Disks (DVDs), Blu-Ray disks, flash memory cards, microfluidics chips, wafers or printed circuit boards, wherein the items are peripherally tagged within a width of, the thin, side edges of the items with light-responsive transponders.

2. The reader of claim 1, wherein the movement element(s) are skids, rollers or wheels.

3. The reader of claim 1, wherein the movement element is a robot programmable to move the body to the body, with aligner engaged with the corresponding element, along the stack of items so that the light-emitting port serially aligns with the transponders of the stack.

4. The reader of claim 1, wherein the one or more aligners are slots or fins.

5. The reader of claim 4, wherein the aligners are shaped to funnel the sides of the items into better alignment with the light-emitting port.

6. The reader of claim 1, further comprising a mask adapted to limit leakage of the emitted light in a forward or backward direction relative a direction for which the reader is configured to move.

7. The reader of claim 1, further comprising a mechanical or electromechanical arm, clamp, gripper or suction device to facilitate the rapid retrieval of selected items.

8. The reader of claim 1, further comprising a controller operatively linked to the reader.

9. A method of operating a reader of claim 7, comprising:
inputting into the controller an identifier for a sought-for item;
moving the reader along a stack of items such that the light-emitting port and the transponders serially align; and
emitting a positive signal from the reader when the reader reads an identifier corresponding to the inputted identifier.

10. The method of claim 9, further comprising:
emitting a distinct negative signal in conjunction with the ID reader is reading a non-matching or a series of non-matching transponders.

11. The method of claim 9, wherein the positive signal is a sound.

12. The method of claim 9, comprising:
moving the reader past a sought-for item such that the signal is emitted; and
moving the reader in the opposite direction to again align with the sought-for item such that the signal is emitted.

13. The method of claim 9, comprising the activation of a mechanical gripper either manually or automatically upon recognition of the inputted identifier, wherein automatic activation is under the direction of the controller.

14. A method of scanning closely proximate stacked items that are peripherally tagged within a width of, thin, side edges of the items with light-responsive transponder chips, comprising:
inputting into a controller an identifier for a sought-for item;
moving an identification (ID) reader for reading identifiers (IDs) stored electronically on the chips along a stack of items tagged with such chips such that the reader and the transponders serially align for reading IDs utilizing one or more aligners coupled to or incorporated into the ID reader and adapted to operate with a corresponding element on a stack of the items, or a container for a stack of the items, so as to align the ID reader with the transponders to trigger the transponders; and
emitting a positive signal from the ID reader when the reader reads the identifier (ID) corresponding to the inputted identifier, wherein the ID reader is configured for reading closely proximate stacked items that are specimen slides, tissue cassettes, tissue blocks, blood spot cards, microtiter plates, petri dishes, Compact Disks (CDs), Digital Versatile Disks (DVDs), Blu-Ray disks, flash memory cards, microfluidics chips, wafers or printed circuit boards, wherein the items are peripherally tagged within a width of, the thin, side edges of the items with light-responsive transponders.

15. The method of claim 14, wherein the closely proximate stacked items are specimen slides.

16. The method of claim 14, wherein the closely proximate stacked items are tissue cassettes.

17. The method of claim 14, wherein the closely proximate stacked items are tissue blocks.

18. The method of claim 14, wherein the closely proximate stacked items are blood spot cards.

19. The method of claim 14, wherein the closely proximate stacked items are microtiter plates.

* * * * *